United States Patent
Uroz Soria et al.

(10) Patent No.: US 10,341,534 B2
(45) Date of Patent: Jul. 2, 2019

(54) COLOR CALIBRATION

(71) Applicant: HEWLETT-PACKARD DEVELOPMENT COMPANY, L.P., Houston, TX (US)

(72) Inventors: Juan Uroz Soria, Terrassa (ES); Pere Gasparin Talarn, Barcelona (ES); Antonio Gracia Verdugo, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/503,837

(22) PCT Filed: Aug. 26, 2014

(86) PCT No.: PCT/US2014/052700
§ 371 (c)(1),
(2) Date: Feb. 14, 2017

(87) PCT Pub. No.: WO2016/032440
PCT Pub. Date: Mar. 3, 2016

(65) Prior Publication Data
US 2017/0244869 A1   Aug. 24, 2017

(51) Int. Cl.
*H04N 1/60* (2006.01)
*H04N 1/00* (2006.01)

(52) U.S. Cl.
CPC ....... *H04N 1/6033* (2013.01); *H04N 1/00015* (2013.01); *H04N 1/00023* (2013.01);
(Continued)

(58) Field of Classification Search
CPC ............ H04N 1/6033; H04N 1/00015; H04N 1/00023; H04N 1/00034; H04N 1/00045; H04N 1/00087; H04N 2201/0082
(Continued)

(56) References Cited

U.S. PATENT DOCUMENTS 5,573,831 A   11/1996  Suzuki et al.
7,548,705 B2   6/2009  Morales et al.
(Continued)

FOREIGN PATENT DOCUMENTS

EP   0974225   1/2000
EP   2301757   3/2011
(Continued)

OTHER PUBLICATIONS

Shaw, Mark, et al. Color Printer Characterization Adjustment for Different Substrates. Nov. 6, 2002.

*Primary Examiner* — Quang N Vo
(74) *Attorney, Agent, or Firm* — HP Inc. Patent Department

(57) ABSTRACT

Example implementations relate to color compensation. Some examples may print a calibration target background on a non-opaque media. The calibration target background may have a color that increases a dynamic range of a set of color measurements of a calibration target foreground. Some examples may print the calibration target foreground over the calibration target background. Additionally, some examples may measure an optical density of the calibration target foreground with a reflective sensor and may calibrate a printer based on the measured optical density.

15 Claims, 5 Drawing Sheets

(52) U.S. Cl.
CPC ..... *H04N 1/00034* (2013.01); *H04N 1/00045* (2013.01); *H04N 1/00087* (2013.01); *H04N 2201/0082* (2013.01)

(58) Field of Classification Search
USPC ........................................ 358/1.9, 1.15, 518
See application file for complete search history.

(56) References Cited

U.S. PATENT DOCUMENTS

| | | | |
|---|---|---|---|
| 8,727,476 | B2 | 5/2014 | Pous et al. |
| 2004/0114190 | A1* | 6/2004 | Man ................. B41M 3/10 358/3.28 |
| 2010/0014781 | A1* | 1/2010 | Liu .................. H04N 13/0022 382/285 |
| 2011/0205568 | A1 | 8/2011 | Moalem et al. |
| 2013/0215472 | A1* | 8/2013 | Rossier ............. H04N 1/4055 358/3.06 |
| 2013/0222461 | A1 | 8/2013 | Kaszynski |
| 2013/0258359 | A1 | 10/2013 | Soria et al. |
| 2013/0321514 | A1 | 12/2013 | Pous et al. |
| 2014/0139850 | A1 | 5/2014 | Soria et al. |

FOREIGN PATENT DOCUMENTS

| | | |
|---|---|---|
| EP | 2306700 | 4/2011 |
| GB | 1133283 | 11/1968 |
| JP | 2002234213 | 8/2002 |
| WO | WO-9846008 | 10/1998 |

\* cited by examiner

COLOR CALIBRATION

BACKGROUND

A printer may not print a color as desired due to numerous factors. For example, the colors produced by printers can vary as a function of media type, ink, writing engines, temperature, humidity, and the like. To address color variation of printers that print on opaque media (i.e., media that is not transparent or translucent), a typical opaque media printer may be color calibrated by printing a target that includes patches having known color values. A color measurement device may scan the target, and the color measurements may be used to create a profile for the printer that can be used such that printed colors are printed as intended.

BRIEF DESCRIPTION OF THE DRAWINGS

The following detailed description references the drawings, wherein.

DETAILED DESCRIPTION

Figure 1:
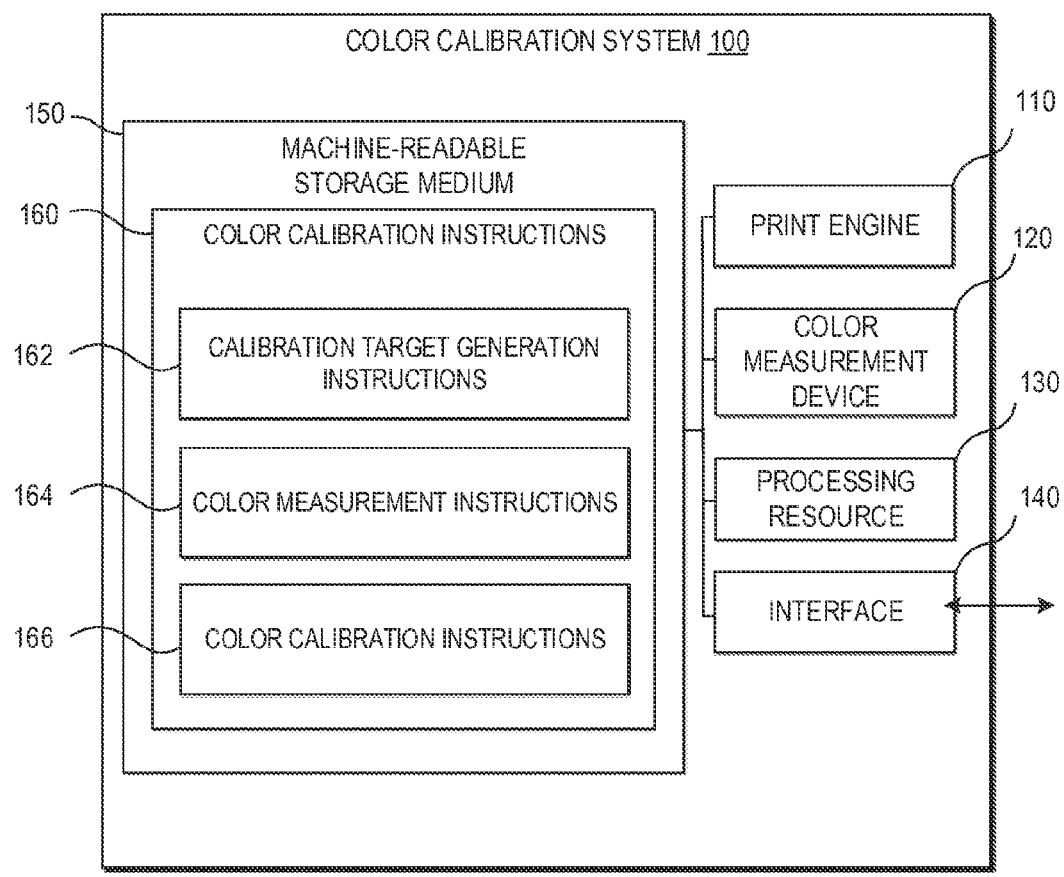
FIG. 1 is a block diagram of an example color calibration system consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, a printer may be colored calibrated by printing a target on an opaque media and performing a color measurement of the target. For example, a typical printer may print a plurality of color patches arranged in a predetermined pattern and a color measurement device (e.g., a spectrophotometer or a colorimeter) may scan the patches to perform a color measurement. The color measurement may be used to derive calibration data that may be used by the printer to ensure the printing of colors in a consistent manner.

Typical color measurement devices measure reflected light, and thus work primarily on opaque media. For example, a spectrophotometer may illuminate a target with a light source and measure the amount of light reflected from the target to perform a color measurement. However, if the substrate is non-opaque (e.g., translucent, transparent, etc.), color measurements performed using reflective color measurement devices may not be sufficiently accurate. For example, a color measurement device illuminating a particular target may generate light that passes through the target and onto the print platen. Thus, the reflected light returned for measurement may be predominantly light reflected by the print platen instead of light reflected by the target. Since the color measurement device is primarily measuring the light reflected off the print platen and not the target, the color measurement may be inaccurate. As many printers already include reflective color measurement devices, it would be convenient to be able to use those devices when printing on non-opaque media. Accordingly, to achieve optimal print quality, printers designed with reflective color measurement devices should be capable of performing accurate color calibration on non-opaque media using reflective color measurement.

Examples disclosed herein may provide color calibration for non-opaque media printers using reflective color measurement. To this end, example implementations disclosed herein may provide color calibration by printing a calibration target on a non-opaque media. The calibration target may include a calibration target foreground and a calibration target background. The calibration target foreground may include a set of foreground color patches and the calibration target background may include a set of background color patches. As used herein, the term "set" means at least one. In some examples, each of the set of foreground color patches may have at least one corresponding background color patch that has a color that optimizes at least one of a dynamic range and a monotonicity of a set of color measurements of a set of foreground color patches. As used herein, the term "dynamic range" may be considered to be the luminance ratio of the brightest element in the color patch that is being measured to the darkest element in the color patch that is being measured. Furthermore, as used herein, the term "monotonicity" may be considered to be a graphical representation of a general stimulus-response, where a characteristic of the response is consistently increasing and never decreasing, or consistently decreasing and never increasing, for increasing stimuli. Additionally, in some examples the color measurement may be performed by a reflective sensor and/or may represent an amount of light reflected by the calibration target foreground. Furthermore, in some examples, a printer may be calibrated based on the color measurement.

Referring now to the drawings, FIG. 1 is a block diagram of an example color calibration system 100 consistent with disclosed implementations. Color calibration system 100 may be implemented in various ways. For example, color calibration system 100 may be a computing system, a printer, and/or any other type of system or device that can perform color calibration. In the example shown in FIG. 1, color calibration system 100 may include a print engine 110, a color measurement device 120, a processing resource 130, an interface 140, and a machine-readable storage medium 150.

Print engine 110 may be any component or collection of components suitable to print a calibration target on non-opaque media. For example, print engine 110 may be a combination of hardware and instructions suitable to print a calibration target foreground and/or a calibration target background. In some implementations, print engine 110 may include at least one printhead and/or write engine and a media transport system to advance media. Additionally, in some implementations, print engine 110 may include at least one of ink reservoirs, pumps, tubing, drying elements and the like. Examples of non-opaque media include, but are not limited to, some papers and various backlit films.

Color measurement device 120 may be any type of device suitable for measuring color. For example, color measurement device 120 may be an embedded spectrophotometer, a colorimeter, a scanner, a digital camera, and/or any other suitable reflective sensor. In some implementations, color measurement device 120 may perform a color measurement of the calibration target foreground and/or the calibration target background. For example, color measurement device 120 may illuminate the calibration target foreground and measure the amount of light reflected by the calibration target foreground. As another example, color measurement device 120 may scan the calibration target foreground to determine the optical density of the color target foreground. The difference between measurements performed by color measurement device 120 and expected values of those measurements may be used to adjust the parameters of print engine 110 such that printed colors more closely match expected colors.

Processing resource 130 may be at least one processing unit (CPU), microprocessing resource, and/or another hardware device to execute instructions to perform operations. For example, processing resource 130 may fetch, decode, and execute color calibration instructions 160 (e.g., instructions 162, 164, and/or 166) stored in machine-readable storage medium 150 to perform operations related to disclosed examples.

Interface device 140 may be any device that facilitates the transfer of information between color calibration system 100 and external components, such as a printer, a computing system, a server, and/or any other suitable type of device. In some examples, interface device 140 may include a network interface device that allows color calibration system 100 to receive and send data to and from a network. For example, interface device 140 may retrieve and process data related to adjusting parameters of a printer from a computing system remote to system 100.

Machine-readable storage medium 150 may be any electronic, magnetic, optical, or other physical storage device that stores executable instructions. Thus, machine-readable storage medium 150 may be, for example, Random Access Memory (RAM), Electrically-Erasable Programmable Read-Only Memory (EEPROM), a storage drive, an optical disc, and the like. In some implementations, machine-readable storage medium 150 may be a non-transitory computer-readable storage medium, where the term "non-transitory" does not encompass transitory propagating signals. Machine-readable storage medium 150 may be encoded with instructions that, when executed by processing resource 130, perform operations consistent with disclosed implementations. For example, machine-readable storage medium 150 may include color calibration instructions 160 that, when executed by processing resource 130, perform operations that may color calibrate a printer. In the example shown in FIG. 1, machine-readable storage medium 150 may include calibration target generation instructions 162, color measurement instructions 164, and/or color calibration instructions 166.

Calibration target generation instructions 162 may function to print a calibration target on non-opaque media. For example, when calibration target generation instructions 162 are executed by a processing resource, such as processing resource 130 of system 100, calibration target generation instructions 162 may cause print engine 110 and/or processing resource 130 to print a calibration target foreground and/or a calibration target background on non-opaque media. For example, print engine 110 may print a calibration target background on a background area of the non-opaque media, move the non-opaque media in a backwards direction, and print a calibration target foreground directly on the calibration target background and/or on at least a portion of the background area. Examples of steps that may be involved with these processes are described in further detail below with respect to, for example, FIGS. 2-4.

Color measurement instructions 164 may function to perform a color measurement of the calibration target foreground and/or background. For example, when color measurement instructions 164 are executed by a processing resource, such as processing resource 130 of color calibration system 100, color measurement instructions 164 may cause color measurement device 120 and/or processing resource 130 to measure the amount of light reflected by the calibration target foreground. In some examples, color measurement device may measure the optical density of the calibration target foreground. Examples of steps that may be involved with these processes are described in further detail below with respect to, for examples, FIGS. 2-5.

Color calibration instructions 166 may function to color calibrate a printer. For example, when color calibration instructions 166 are executed by a processing resource, such as processing resource 130 of color calibration system 100, color calibration instructions 166 may cause processing resource 130 to compare the set of color measurements to a set of expected color values. In some implementations, the parameters of print engine 110 may be adjusted based on the difference between the set of color measurements and the set of expected color values. Examples of these processes are described in further detail below with respect to, for example, FIGS. 2-5.

The arrangement illustrated in FIG. 1 is simply an example, and color calibration system 100 may be implemented in a number of different configurations. For example, while FIG. 1 shows one print engine 110, color measurement device 120, processing resource 130, interface 140, and machine-readable storage medium 150, color calibration system 100 may include any number of components 110, 120, 130, 140, and/or 150 as well as other components not depicted in FIG. 1. As another example, color calibration system 100 may omit or combine any of components 110, 120, 130, 140, and/or 150. As yet another example, while FIG. 1 shows that each of components 110, 120, 130, 140, and 150 are communicatively connected, at least one of components, 110, 120, 130, 140, and 150 may or may not be communicatively connected to each other, to other components of color calibration system 100, and/or to external components.

Figure 2:
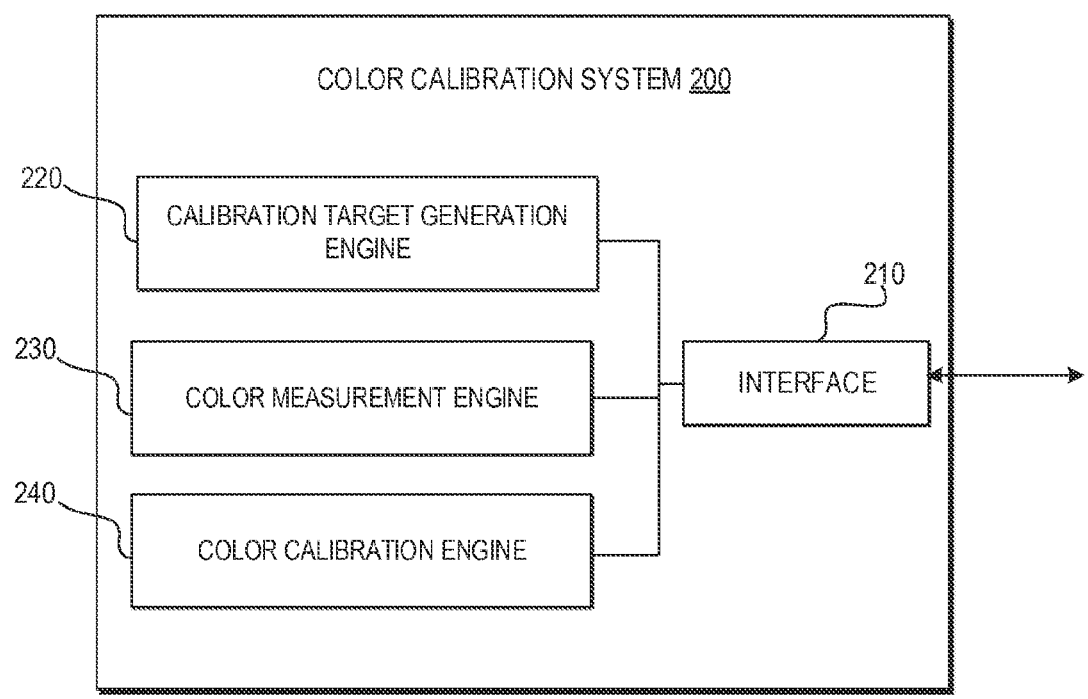
FIG. 2 is a block diagram of an example color calibration system consistent with disclosed implementations.

FIG. 2 is a block diagram of an example color calibration system 200 consistent with disclosed implementations. In certain aspects, color calibration system 200 may correspond to color calibration system 100 of FIG. 1. Color calibration system 200 may be implemented in various ways. For example, color calibration system 200 may include at least one printer, computing system, and/or any other suitable component or collection of components. In the example shown in FIG. 2, color calibration system 200 may include an interface device 210, a calibration target generation engine 220, a color measurement engine 230, and a color calibration engine 240.

Interface device 210 may be any device that facilitates the transfer of information between color calibration system 200 and external components. In some examples, interface device 210 may include a network interface device that allows color calibration system 200 to receive and send data to and from a network. For example, interface device 210 may retrieve and process data related to printing a calibration target from a device external to color calibration system 200.

Engines 220, 230, and 240 may be electronic circuitry for implementing functionality consistent with disclosed examples. For example, engines 220, 230, and 240 may represent combinations of hardware devices and instructions to implement functionality consistent with disclosed implementations. For example, the instructions for the engines may be processing resource-executable instructions stored on a non-transitory machine-readable storage medium and the hardware for the engines may include a processing resource to execute those instructions. In some examples, the functionality of engines 220, 230, and 240 may correspond to operations performed by color calibration system 100 of FIG. 1, such as operations performed when color calibration instructions 160 are executed by processing resource 130. In FIG. 2, calibration target generation engine 220 may represent a combination of hardware and instructions that performs operations similar to those performed when processing resource 130 executes calibration target generation instructions 162. Similarly, second color measurement engine 230 may represent a combination of hardware and instructions that performs operations similar to those performed when processing resource 130 executes color measurement instructions 164, and color calibration engine 240 may represent a combination of hardware and instructions that performs operations similar to those performed when processing resource 130 executes color calibration instructions 166.

Figure 3:
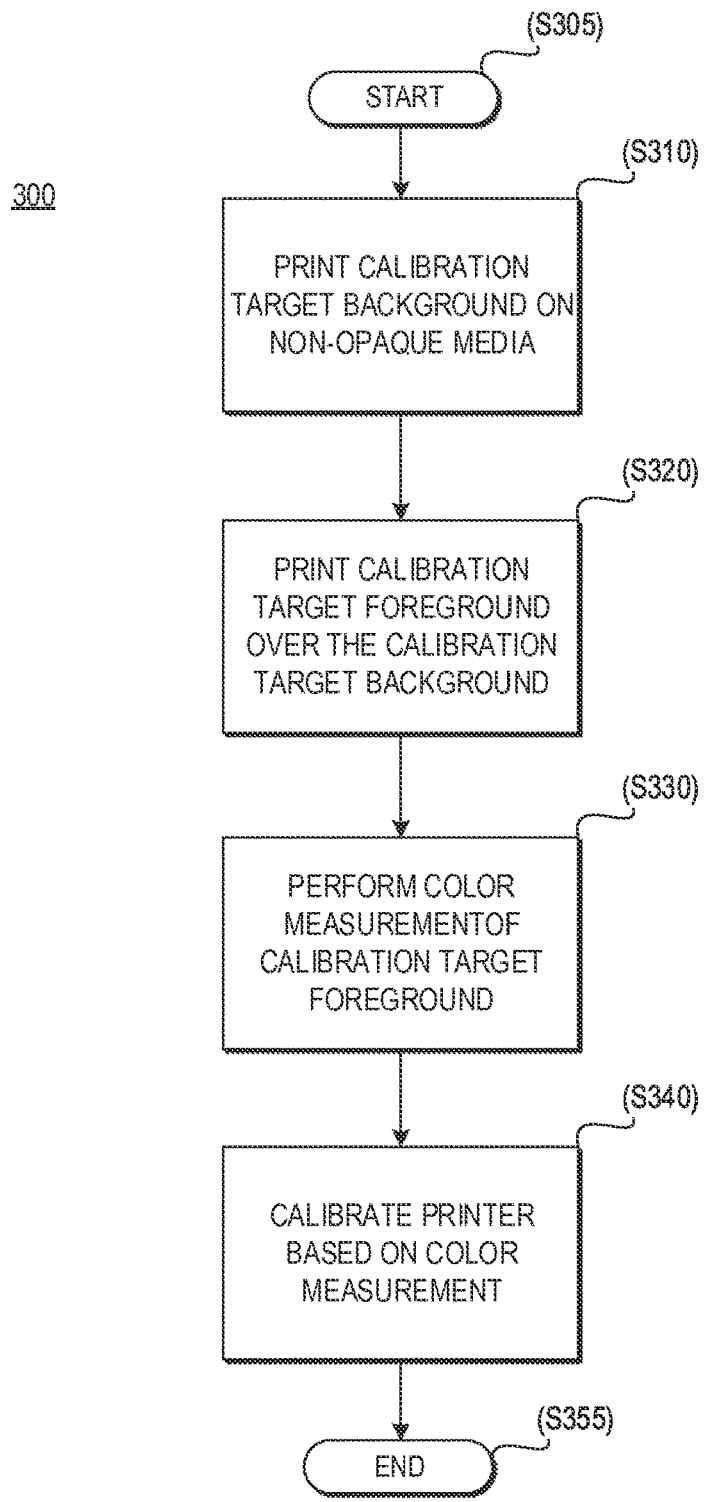
FIG. 3 is a flow chart of an example process for color calibration consistent with disclosed implementations.

FIG. 3 is a flow chart of an example process 300 for color compensation consistent with disclosed implementations. Although execution of process 300 is described below with reference to color calibration system 100 of FIG. 1 and/or specific components of color calibration system 100, other suitable systems and devices for execution of at least one step of process 300 may be used. For example, processes described below as being performed by color calibration system 100 may be performed by color calibration system 200 and/or any other suitable device or system. Process 300 may be implemented in the form of executable instructions stored on a storage device, such as a machine-readable storage medium, and/or in the form of electronic circuitry.

Process 300 may start (step S305) before, during, or after a print device has executed a printing operation, and may be performed automatically after a particular event has occurred and/or may be performed based on user-supplied instructions. Since some printers print by ejecting a particular number of drops, any difference between the drops of an original print head and a replacement print head may affect the color accuracy of a print produced using the replacement printhead. For example, the size, weight, volume, and/or the like of printing fluid droplets can vary between print heads. Accordingly, in some examples, process 300 may start automatically after system 100 detects a printhead change in print engine 110. As another example, a user may input an instruction to perform color calibration to a component or collection of components of system 100 (e.g., via an input on a user interface of a print device), system 100 may detect the input of the instruction, and system 100 may start process 300 based on the detection of the instruction.

Process 300 may also include printing a calibration target background on a non-opaque media. For example, print engine 110 of system 100 may print the calibration target background by ejecting printing fluid (e.g., printing fluid drops) while a non-opaque media is advancing in a printing direction. In some implementations, print engine 110 may eject the plurality of printing fluid drops on a background area of the non-opaque media. For example, the background area may be any area of the non-opaque media and may be specified by coordinates which are stored in machine-readable storage medium 150. Processing resource 130 may execute instructions that access these coordinates and cause print engine 110 to print various portions of the calibration target background (and/or foreground) on the background area. In some implementations, the background color patches may include a plurality of layers and/or include a high quantity of printing fluid. For example, print engine 110 of system 100 may eject a plurality of printing fluid drops while the non-opaque media is advancing in a printing direction to form a first layer of a background patch. Print engine 110 may then move the non-opaque media in a backwards direction (e.g., a direction substantially opposite the printing direction) and may eject a plurality of printing fluid drops over the first layer to form a second layer of the background patch. In some implementations, print engine 110 may repeat the process to print a number of layers such that the background calibration target comprises a volume of ink greater than the maximum volume of ink that can be ejected in a single pass of print engine 110. For example, print engine 110 may repeat the process to print a predetermined number of layers (e.g., one layer, two layers, three layers, four layers, etc.) to form the background color patch. In some implementations, the predetermined number of layers may be based on whether any additional printing fluid supplied to the background color patch would change a set of color measurements performed by color measurement device 120. In other implementations, print engine 110 may repeat the process until a set of color measurement of the calibration target background (e.g., a particular background patch) reaches a threshold value and/or it is otherwise verified that color measurement stability has been reached. For example, print engine 110 may print layers of at least one process color (e.g., a primary printer color, such as cyan, magenta, yellow, and/or black), perform a color measurement of the layer using color measurement device 120, and continue printing layers until the color measurement performed by color measurement device 120 remains constant. The color measurement can be performed at any time, such as after each layer is printed, at predetermined intervals, at predetermined times, and/or the like.

In some implementations, the calibration target background may include a set of background color patches. Thus, in some implementations, step S310 of process 300 may include printing the calibration target background as a set of background color patches using at least one of the processes described above. In some examples, each of the set of background color patches may correspond to at least one foreground color patch and may have a color that optimizes at least one of a dynamic range and a monotonicity of a set of color measurements, such as a set of color measurements performed by color measurement device 120. For example, if a calibration target foreground was printed directly on the non-opaque media, a first set of color measurements of the calibration target foreground would have a first monotonicity and/or a first dynamic range. If the same calibration target foreground were printed on a calibration target background consistent with disclosed implementations, a second set of color measurements of the calibration target foreground would have a second monotonicity and a second dynamic range, and at least one of the second monotonicity and the second dynamic range would be greater than the first monotonicity and the first dynamic range, respectively. Thus, a calibration target foreground printed over a calibration target background consistent with disclosed implementations may increase at least one of a range and a monotonicity of a color measurement of the calibration target foreground.

Furthermore, since each of the set of foreground color patches may have a particular predetermined color, in some examples system 100 may select a color for each background color patch based on the color of its corresponding foreground patch to optimize the dynamic range and/or monotonicity of a color measurement of the particular foreground color patch. For example, a first foreground color patch having a first color may be formed over a first background color patch having a second color. The second color may be selected based on the first color, and may have a color value that is known to produce color measurements having a high dynamic range and/or monotonicity when used, consistent with disclosed examples, as a background to the first color. For example, machine-readable storage medium 150 may store a table including potential foreground color patch colors and the corresponding background color patch color that would optimize at least one of the dynamic range and the monotonicity of the color measurement. Processing resource 130 may execute instructions that identify a foreground color patch to be printed and determine a corresponding color for its background color patch by looking up the identified color in the table and determining the corresponding background color from the table. Processing resource 130 may then execute instructions that cause print engine 110 to print the background color patch using the identified color.

While in some examples each foreground color patch may have a corresponding background color patch that optimizes the color of the particular foreground color patch (e.g., a plurality of foreground color patches and a plurality of background color patches, where each foreground color patch has its own separate background color patch), examples consistent with disclosed implementations need not have a 1:1 correspondence between foreground color patches and background color patches. For example, in some implementations, the calibration target background may include a single background patch of a uniform color that is formed under a plurality of foreground color patches. In some implementations, the uniform color may be a process color, such as cyan, magenta, yellow, or black. In some implementations, the uniform color may be a color that is different from the color of a corresponding foreground patch. For example, each foreground color patch may be printed with a specific fixed amount of ink. By printing the background color patch with the same color as the foreground color patch (i.e., essentially overprinting the foreground color patch), the color measurement of the foreground color patch may be obscured. Examples of calibration target backgrounds are discussed in more detail below with respect to, for example, FIGS. 4A and 4B Process 300 may also include printing a calibration target foreground over the calibration target background (step S320). For example, print engine 110 may eject a plurality of printing fluid drops to print a calibration target foreground on at least a portion of the background area of the non-opaque media. In some implementations, the calibration target foreground may be printed after an ink-drying delay (e.g., a delay during which the calibration target background is dried, cured, and/or the like to prevent the mixing of printing fluid between the calibration target background and the calibration target foreground). For example, after the calibration target background ink has been dried, cured, and/or the like, print engine 110 may move the non-opaque media in a backwards direction (e.g., a direction substantially opposite the printing direction) such that print engine 110 may print the calibration target foreground directly on top of (e.g., in direct contact with) the calibration target background. In some implementations, print engine 110 may print the calibration target foreground based on the coordinates of the background area and/or coordinates related to the background area. For example, the coordinates of the background area and/or the area in which the calibration target foreground is to be printed may be stored in machine-readable storage medium 150, and processing resource 130 may execute instructions that access these coordinates and cause print engine 110 to print various portions of the calibration target foreground at a particular location corresponding to the coordinates In some examples, the calibration target foreground may include a set of foreground color patches. Print engine 110 may print any number of foreground color patches, and each patch may have a known color value representing a mixture of at least one of a set of process colors. For example, a printer may have a CMYK color space, and each patch may have a color value corresponding to a mixture of the four different process color printing fluids (e.g., a mixture of cyan, magenta, yellow, and/or black inks). As another example, a printer may use a CMYKcm color space, and thus each patch may a color value corresponding to a mixture of cyan, magenta, yellow, black, light cyan and/or light magenta. As yet another example, a printer may have a CMYKOG color space, and thus each patch may have a color value corresponding to a mixture of cyan, magenta, yellow, black, orange, and/or green inks. Thus, in some examples, each patch may be assigned a particular known color value based on the printer's color space, and that known color value may have an associated expected color measurement. Examples of calibration target foregrounds are discussed in more detail below with respect to, for example, FIGS. 4A and 4B.

Process 300 may also include performing a color measurement of the calibration target foreground (step S330). For example, color measurement device 120 may perform a color measurement of each foreground patch in the calibration target foreground to obtain a measured color value for each patch and to generate a set of color measurements. In some implementations, the measured color value may be the red, green, and blue (RGB) values from a standard scanner, the values from a spectrophotometer, the values from a colorimeter, and/or values from a custom reflective measurement instrument that reports the color data in non-industry standard units and scale. In some implementations, the measured color value may be in any color space, for example the CIELAB color space, RGB color space, and/or the like. For example, the measured color value may use only the lightness or intensity value in some color spaces (e.g., in the CIELAB color space, only the L* value may be used). As another example, a single number resulting from a calculation involving all of the components of a color space may be used (e.g., a single number from calculations involving L*, a*, and b* or from RGB). As yet another example, different components of a color space may be used for different foreground color patches when comparing the measured values. For example, L* may he used for all color patches except for the yellow patches, where b* is used. In some examples, once the color measurements have been performed by color measurement device 120, at least one of the color measurements may be stored in machine-readable storage medium 150 as the set of color measurements and/or may be transmitted to another component for additional processing.

Process 300 may also include calibrating a printer based on the color measurement (step S340). For example, system 100 may calibrate print engine 110 based on the set color measurement performed by color measurement device 120. In some implementations, system 100 may calibrate print engine 110 by creating a color look-up table based on the measurements performed by color measurement device 120 in view of the color data (target data) used to print the foreground color patches. For example, machine-readable storage medium 150 may be encoded with instructions that, when executed by processor 130, perform operations to access the color measurement of each foreground patch. For example, the color measurements may be received directly from color-measurement device 120 or may be accessed from a machine-readable storage medium, such as machine-readable storage medium 150 of system 100. The color measurements may then be associated with the expected color values to create a color look-up table that maps the actual color measurement to the expected color value. System 100 may then store the color look-up table in a machine-readable storage medium, such as machine-readable storage medium 150, and may use the look-up table to adjust color values present in the images to be printed. For example, for each set of color values to be printed, each one corresponding to one pixel in the image, a new set of color values is fetched through the calibration look-up table, and the latest look-up table will deliver the correct color values. After the printer has been calibrated based on the set of color measurements, process 300 may end (step S355).

Figure 4A:
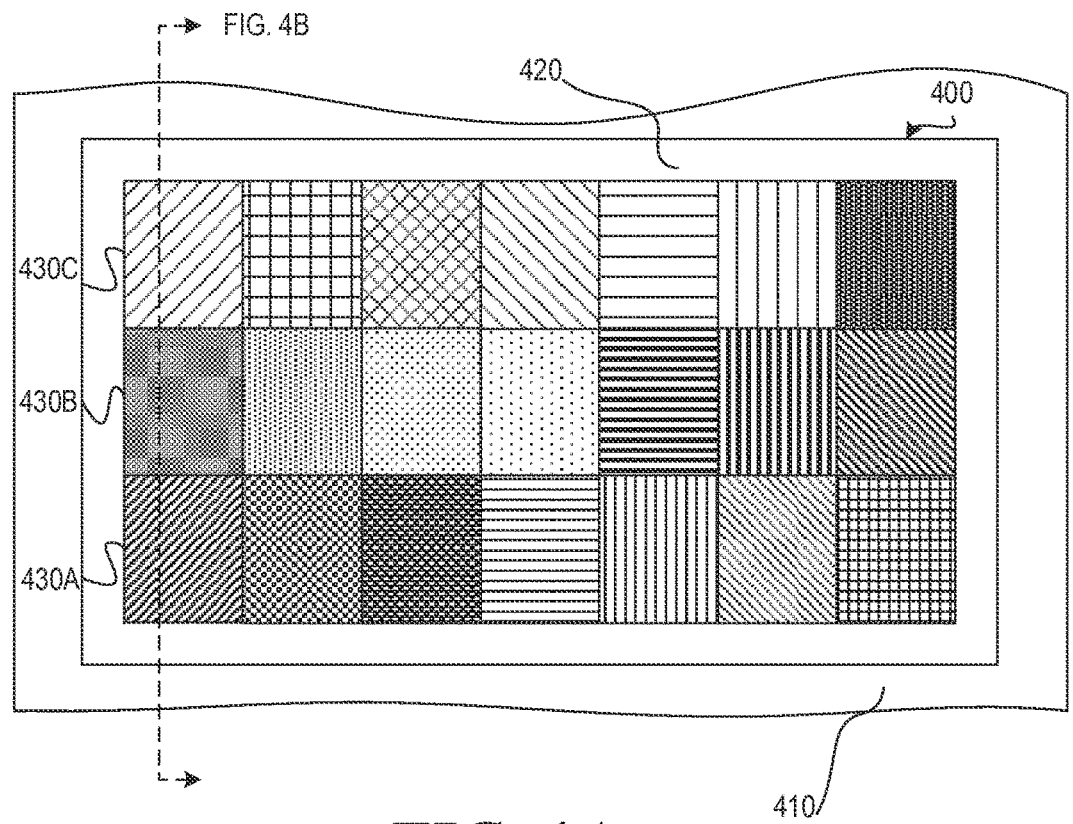
FIG. 4A is a top view of an example calibration target consistent with disclosed implementations.

FIG. 4A is a top view of an example calibration target 400 consistent with disclosed implementations. For example, calibration target 400 may correspond to a calibration target printed by print engine 110 of system 100. As shown in FIG. 4A, calibration target 400 may be printed on non-opaque media 410, and may include a set of background color patches 420 and a set of foreground color patches 430 (for clarity, only foreground color patches 430A, 430B, and 430C are labeled). While example calibration target 400 is shown to have twenty one foreground color patches and a single calibration target background patch in FIG. 4A, implementations consistent with disclosed examples can have any suitable number of foreground color patches and/or background color patches (e.g., tens, hundreds, or thousands of color patches). Furthermore, while the patches in FIG. 4A are represented by a variety of white or black on white fillings, each of these patches would normally be a homogenous color patch, with each patch representing a particular color (and in some instances, multiple patches may have the same color). For example, the patches may have a color based on varying densities of combinations of process color ink (e.g., combinations of cyan, magenta, yellow, and/or black). Additionally, while the set of background color patches (i.e., the single patch) in FIG. 4A extends beyond the set of foreground color patches, implementations of calibration targets consistent with disclosed examples need not have a set of background color patches 420 that extend beyond the boundaries of the set of foreground color patches 410. Indeed, foreground color patches 420 and/or background color patches 430 may be any suitable size and shape and may be positioned at any suitable location of non-opaque media 410.

Figure 4B:
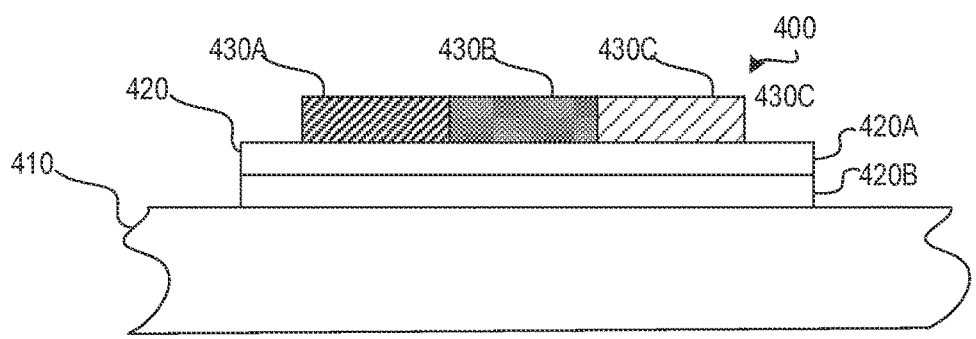
FIG. 4B is a sectional view of the example calibration target illustrated in FIG. 4A.

FIG. 4B is a sectional view of the example calibration target 400 illustrated in FIG. 4A. As shown in FIG. 4B, the set of background color patches (e.g., background patch 420) may be formed directly on non-opaque media 410 and may include a plurality of layers 420A and 420B. While in the example shown in FIG. 4B background patch 420 includes two layers, background color patches consistent with disclosed implementations can have any number of layers (e.g., one layer, four layers, etc.). Furthermore, as shown in FIG. 4A, the foreground color patches 430 (e.g., foreground patches 430A, 430B, and 430C) may be formed directly on the set of background color patches (e.g., background patch 420) such that the foreground color patches 430 are in direct contact with the upper layer of the set of background color patches 420. While the example in FIGS. 4A and 4B show a single background patch 420 having a single color, the set of background color patches consistent with disclosed examples can include any number of patches having colors that are based on the color of the corresponding foreground color patch as discussed above.

Figure 5:
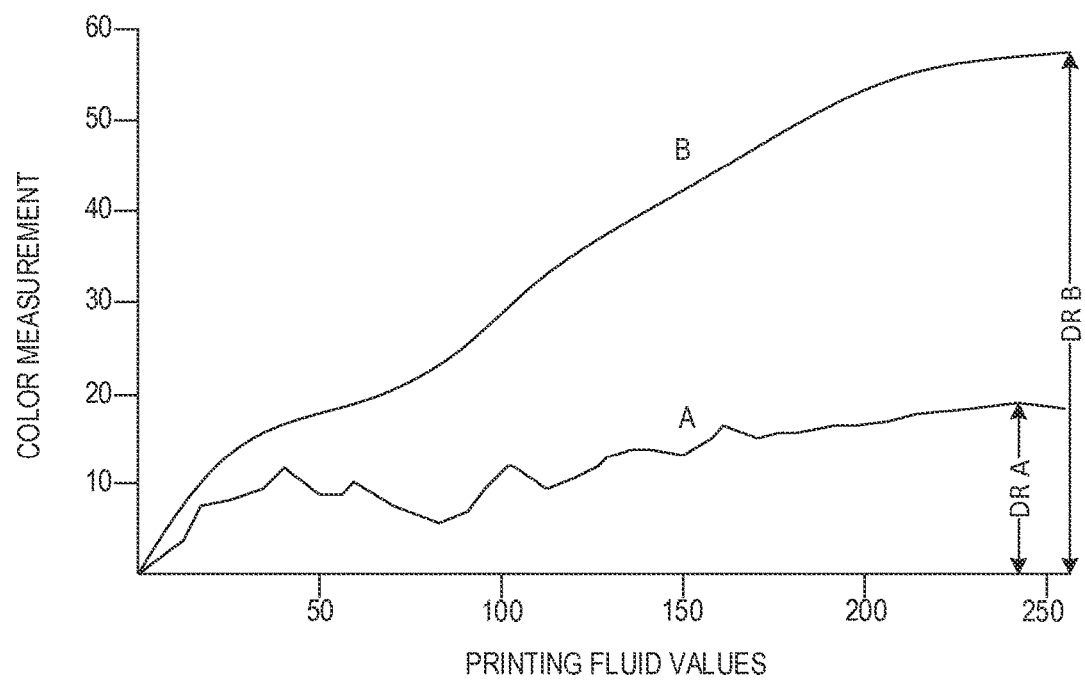
FIG. 5 is an example graph of a set of color measurements of a calibration target foreground consistent with disclosed implementations.

The function of the calibration target background can be further understood with respect to the curves shown in FIG. 5. FIG. 5 is an example graph of a set of color measurements of a calibration target foreground consistent with disclosed implementations. In FIG. 5, the y-axis of the graph represents the color measurement, while the x-axis of the graph represents the amount of printing fluid printed in the foreground color patches. For example, a printing fluid amount of 0 includes no printing fluid, and therefore the color measurement shown is the measurement of the media itself. As shown, curve "A" represents a set of color measurements of a calibration target foreground printed directly on a non-opaque media (i.e., not printed over the calibration target background consistent with disclosed implementations) (hereinafter "Combination A"), while curve "B" represents a set of color measurements of the same or similar calibration target foreground that has been printed on top of a calibration target background consistent with disclosed implementations (herein "Combination B"). For example, curve "B" may represent a set of color measurements of the same calibration target foreground that has been printed on a single process color background patch (e.g., a magenta background patch). As shown in FIG. 5, the set of color measurements of Combination A have a smaller dynamic range (e.g., "DR A") than the set of color measurements of Combination B (e.g., "DR B"). Thus, the combination of the calibration target foreground and the calibration target background increases the dynamic range of the color measurement of the calibration target. Furthermore, FIG. 5 shows an improvement in monotonicity for Combination B over Combination A. In some implementations, monotonicity may occur when non-decreasing color measurements correspond to increasing printing fluid values. The higher the printing fluid value, the higher (or at least equal) the color measurement in a monotonic curve. As shown in FIG. 5, this is true for curve B but not for curve A. For example, in curve A the color measurement corresponding to a printing fluid value of 80 is smaller than that corresponding to a printing fluid value of 40. Accordingly, the use of a calibration target foreground and calibration target background combination consistent with disclosed implementations may improve the dynamic range and/or monotonicity of a color measurement of the calibration target foreground.

The disclosed examples may include systems, devices, computer-readable storage media, and methods for streak compensation. For purposes of explanation, certain examples are described with reference to the components illustrated in FIGS. 1 and 2. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may he used herein to describe various elements, these elements should not be limited by this terms. Instead, these terms are used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A color calibration system comprising:
    a calibration target generation engine to print a calibration target foreground and a calibration target background on a non-opaque media, the calibration target foreground being printed directly on the calibration target background;
    a color measurement engine to perform a color measurement of the calibration target foreground, the color measurement representing an amount of light reflected by the calibration target foreground; and
    a color calibration engine that calibrates a printer based on the color measurement.

2. The color calibration system of claim 1, wherein:
    the color measurement comprises a set of color measurements;
    the calibration target foreground includes a set of foreground color patches; and
    the calibration target background includes a set of background color patches, each background color patch:
        corresponding to at least one foreground color patch of the set of color patches; and
        having a color that optimizes at least one of a dynamic range and a monotonicity of the set of color measurements.

3. The system of claim 1, wherein printing the calibration target foreground and the calibration target background on the non-opaque media comprises:
    printing the calibration target background on a background area of the non-opaque media, the non-opaque media advancing in a printing direction during printing;
    moving the non-opaque media in a backwards direction, the backwards direction being substantially opposite the printing direction; and
    printing the calibration target foreground on at least a portion of the background area.

4. The system of claim 3, wherein printing the calibration target background on the background area of the non-opaque media comprises printing layers of at least one process color on the background area until a color measurement of the calibration target background reaches a threshold value.

5. The system of claim 1, wherein the color measurement is a measurement of an optical density.

6. The system of claim 1, wherein:
    the calibration target background comprises only one process color; and
    the calibration target foreground comprises the one process color and a second process color.

7. The system of claim 1, wherein printing the calibration target on the non-opaque media comprises:
    printing a set of background color patches; and
    after printing the set of background color patches, printing a set of foreground color patches directly on top of the set of background color patches, each of the set of background color patches having a color based on a color of a corresponding foreground color patch of the set of foreground color patches.

8. The system of claim 1, wherein the calibration target background increases a dynamic range of a set of color measurements of the calibration target foreground.

9. A method for calibrating printers based on reflective measurements of non-opaque media comprising:
    printing a calibration target background on a non-opaque media, the calibration target background having a color that increases a dynamic range of a set of color measurements of a calibration target foreground;
    printing the calibration target foreground over the calibration target background;
    measuring an optical density of the calibration target foreground with a reflective sensor; and
    calibrating a printer based on the measured optical density.

10. The method of claim 9, wherein printing the calibration target background on the non-opaque media comprises printing a plurality of background layers until a measurement of the calibration target background remains constant.

11. The method of claim 10, wherein a volume of ink included in the calibration target background exceeds a maximum volume of ink in a single pass of a printer that prints the calibration target background.

12. The method of claim 9, wherein the calibration target foreground is in direct contact with the calibration target background.

13. A printer comprising:
    a processor;
    a print engine coupled to the processor, the print engine having ink with a first process color and a second process color;
    a non-transitory computer-readable storage medium including instructions that, when executed by the processor, cause the print engine to:
        print a calibration target background on a non-opaque media using at least one of the first process color and the second process color;
        print a calibration target foreground on the calibration target background using the first process color and the second process color, the calibration target foreground being printed such that it is at least partially surrounded by the calibration target background; and
    a reflective sensor to measure an optical density of the calibration target foreground.

14. The printer of claim 13, where a color of the calibration target background is selected based on a color of the calibration target foreground.

15. The printer of claim 14, wherein the color of the calibration target background is a single process color.

* * * * *

UNITED STATES PATENT AND TRADEMARK OFFICE
CERTIFICATE OF CORRECTION

PATENT NO. : 10,341,534 B2
APPLICATION NO. : 15/503837
DATED : July 2, 2019
INVENTOR(S) : Juan Uroz Soria et al.

Page 1 of 1

It is certified that error appears in the above-identified patent and that said Letters Patent is hereby corrected as shown below:

In the Drawings

In sheet 3 of 5, FIG. 3, reference numeral S330, Line 2, delete "MEASUREMENTOF" and insert -- MEASUREMENT OF --, therefor.

Signed and Sealed this
First Day of October, 2019

Andrei Iancu
*Director of the United States Patent and Trademark Office*